(12) United States Patent  
Green et al.

(10) Patent No.: US 8,583,629 B2  
(45) Date of Patent: Nov. 12, 2013

(54) METHODS AND APPARATUS TO SAVE SEARCH DATA

(75) Inventors: David P. Green, Castaic, CA (US); Tommi J. Iten, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 368 days.

(21) Appl. No.: 12/132,173

(22) Filed: Jun. 3, 2008

(65) Prior Publication Data

US 2009/0299968 A1 Dec. 3, 2009

(51) Int. Cl.
*G06F 7/00* (2006.01)
*G06F 17/30* (2006.01)

(52) U.S. Cl.
CPC .... *G06F 17/30672* (2013.01); *G06F 17/30699* (2013.01); *G06F 17/30864* (2013.01)
USPC ............ 707/722; 707/758; 707/759; 707/769

(58) Field of Classification Search
None
See application file for complete search history.

(56) References Cited

U.S. PATENT DOCUMENTS

| | | | |
|---|---|---|---|
| 6,321,226 B1 * | 11/2001 | Garber et al. | 1/1 |
| 7,216,121 B2 * | 5/2007 | Bachman et al. | 1/1 |
| 2004/0249790 A1 * | 12/2004 | Komamura | 707/3 |
| 2006/0004850 A1 * | 1/2006 | Chowdhury | 707/103 R |
| 2006/0047636 A1 * | 3/2006 | Mohania et al. | 707/3 |
| 2006/0140584 A1 * | 6/2006 | Ellis et al. | 386/83 |
| 2007/0067275 A1 * | 3/2007 | Shekel | 707/4 |
| 2007/0186267 A1 * | 8/2007 | Ohde et al. | 725/135 |
| 2008/0270393 A1 * | 10/2008 | Doganata et al. | 707/5 |

* cited by examiner

*Primary Examiner* — Jay Morrison

(57) ABSTRACT

Methods and apparatus to save search data are described. An example method for use in media presentation system includes receiving one or more characters to form a search string to be used in a first type of search; converting the search string to one or more keywords to be used in a second type of search; and storing the one or more keywords in a collection of keyword search data to enable a selection of stored keyword search data to perform a search of the second type.

22 Claims, 9 Drawing Sheets

METHODS AND APPARATUS TO SAVE SEARCH DATA

FIELD OF THE DISCLOSURE

The present disclosure relates generally to media presentation systems and, more particularly, to methods and apparatus to save search data.

BACKGROUND

Media presentation systems often provide a user interface through which commands can be received and information conveyed. A typical user interface is implemented in a series of on-screen menus, lists, and/or guides. These elements of the user interface may indicate what programs, movies, music, or other events are scheduled for broadcast at certain times, which programs are scheduled for downloading, the contents of a queue, etc. For example, the user may manipulate a cursor through a program guide via a remote control or another similar input device to identify upcoming or current programming.

SUMMARY

An example method includes receiving one or more characters to form a search string to be used in a first type of search. Further, the example method includes converting the search string to one or more keywords to be used in a second type of search. Further, the example method includes storing the one or more keywords in a collection of keyword search data to enable a selection of stored keyword search data to perform a search of the second type.

An example apparatus includes an interface module to receive one or more characters to form a search string to be used in a first type of search. Further, the example apparatus includes a converter to convert the search string to one or more keywords to be used in a second type of search. Further, the example apparatus includes a search data storage device to store the one or more keywords in a collection of keyword search data to enable a selection of stored keyword search data to perform a search of the second type.

An example media presentation system includes a transmission system capable of generating and transmitting streams of broadcast media. Further, the example media presentation system includes a receiver capable of receiving the broadcast media and generating video and audio output signals, the receiver including a search module. Further, the example media presentation system includes an interface module to receive one or more characters to form a search string to be used in a first type of search. Further, the example media presentation system includes a converter to convert the search string to one or more keywords to be used in a second type of search. Further the example media presentation system includes a search data storage device to store the one or more keywords in a collection of keyword search data.

Further, at least some segment of the user interface may be dedicated to enabling the user to search through content made available by a service provider. For example, television programming, pay-per-view options, newly available on-demand programs, etc. are usually indexed and/or categorized to enhance the ability of the user to find a specific program or group of programs. A search may be performed using program titles, names, dates, or any other identifying data. Upon reviewing the results of the search, the user may select a program (e.g., an entry in a results list) to tune to a channel, view information associated with a program, determine an upcoming broadcast time, etc.

DETAILED DESCRIPTION

The example methods and apparatus for use in connection with a media presentation system (e.g., a home entertainment system including a media signal decoder and a television) described herein may be implemented in connection with any type of media broadcasting system including, for example, satellite broadcast systems, cable broadcast systems, radio frequency wave broadcast systems, etc. By way of illustration, an example broadcast system is described below in connection with FIG. 1 and an example receiver (e.g., set-top-boxes, broadcast signal decoders, etc.) is described in detail below in connection with FIG. 2. Further, while the following disclosure is made with respect to example DIRECTV® services and systems, it should be understood that many other delivery systems are readily applicable to the described methods and apparatus. Such systems include wired or cable distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), and/or fiber optic networks.

Figure 1:
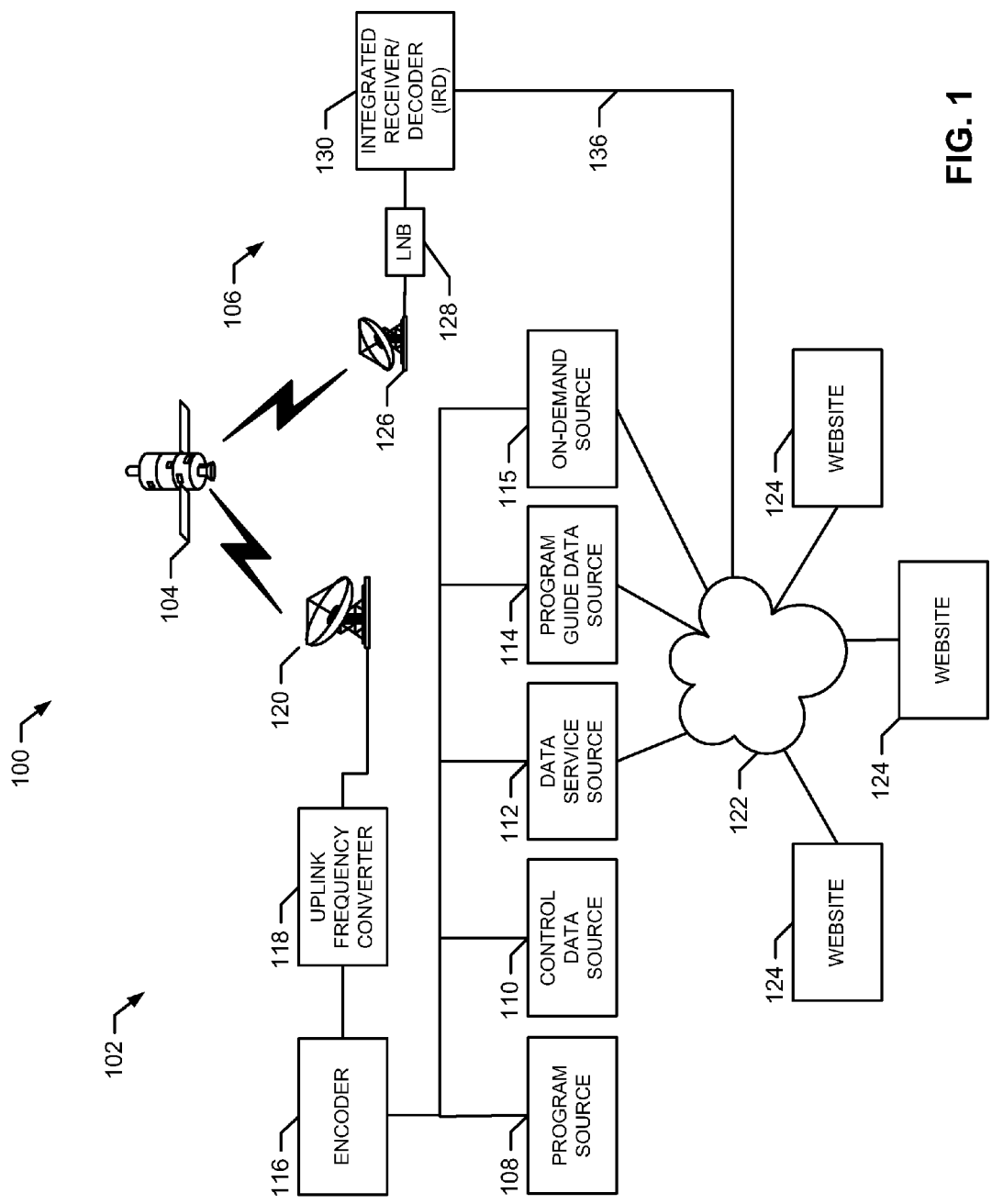
FIG. 1 is a diagram of an example direct-to-home (DTH) transmission and reception system.

As illustrated in FIG. 1, an example direct-to-home (DTH) system 100 generally includes a transmission station 102, a satellite/relay 104 and a plurality of receiver stations, one of which is shown at reference numeral 106, between which wireless communications are exchanged. The wireless communications may take place at any suitable frequency, such as, for example, Ku-band frequencies. As described in detail below with respect to each portion of the system 100, information from the transmission station 102 is transmitted to the satellite/relay 104, which may be at least one geosynchronous or geo-stationary satellite that, in turn, rebroadcasts the information over broad geographical areas on the earth that include receiver stations 106. To facilitate backchannel communications, the receiver stations 106 may be communicatively coupled to the transmission station 102 via a terrestrial communication link, such as a telephone line and/or an Internet connection 136. The Internet connection 136 may also facilitate other general data transfers, such as requests and responses to and from one or more servers of a network 122 and the receiver stations 106.

In further detail, the example transmission station 102 of the example system of FIG. 1 includes a plurality of sources of data and/or information (e.g., program sources 108, a control data source 110, a data service source 112, one or more program guide data sources 114, and an on-demand source 115). During operation, information from one or more of these sources 108, 110, 112, 114, and 115 passes to an encoder 116, which encodes the information for broadcast to the satellite/relay 104. Encoding includes, for example, converting the information into data streams that are multiplexed into a packetized data stream or bitstream using any of a variety of algorithms. A header is attached to each data packet within the packetized data stream to facilitate identification of the contents of the data packet. The header also includes a service channel identifier (SCID) that identifies the data packet. This data packet is then encrypted. As will be readily appreciated by those having ordinary skill in the art, a SCID is one particular example of a program identifier (PID).

To facilitate the broadcast of information, the encoded information passes from the encoder 116 to an uplink frequency converter 118 that modulates a carrier wave with the encoded information and passes the modulated carrier wave to an uplink antenna 120, which broadcasts the information to the satellite/relay 104. Using any of a variety of techniques, the encoded bitstream is modulated and sent through the uplink frequency converter 118, which converts the modulated encoded bitstream to a frequency band suitable for reception by the satellite/relay 104. The modulated, encoded bitstream is then routed from the uplink frequency converter 118 to the uplink antenna 120 where it is broadcast toward the satellite/relay 104.

The programming sources 108 receive video and audio programming from a number of sources, including satellites, terrestrial fiber optics, cable, or tape. The video and audio programming may include, but is not limited to, television programming, movies, sporting events, news, music or any other desirable content.

Like the programming sources 108, the control data source 110 passes control data to the encoder 116. Control data may include data representative of a list of SCIDs to be used during the encoding process, or any other suitable information.

The data service source 112 receives data service information and web pages made up of text files, graphics, audio, video, software, etc. Such information may be provided via the network 122. In practice, the network 122 may be the Internet, a local area network (LAN), a wide area network (WAN) or a conventional public switched telephone network (PSTN). The information received from various sources is compiled by the data service source 112 and provided to the encoder 116. For example, the data service source 112 may request and receive information from one or more websites 124. The information from the websites 124 may be related to the program information provided to the encoder 116 by the program sources 108, thereby providing additional data related to programming content that may be displayed to a user at the receiver station 106.

The program guide data source 114 compiles information related to the SCIDs used by the encoder 116 to encode the data that is broadcast. For example, the program guide data source 114 includes information that the receiver stations 106 use to generate and display a program guide to a user, wherein the program guide may be a grid guide that informs the user of particular programs that are available on particular channels at particular times. The program guide also includes information that the receiver stations 106 use to assemble programming for display to the user. For example, if the user desires to watch a baseball game on his or her receiver station 106, the user will tune to a channel on which the game is offered. The receiver station 106 gathers the SCIDs related to the game, wherein the program guide data source 114 has previously provided to the receiver station 106 a list of SCIDs that correspond to the game. Such a program guide may be manipulated via an input device (e.g., a remote control). For example, a cursor may be moved to highlight a program description within the guide. A user may then select a highlighted program description via the input device to navigate to associated content (e.g., an information screen containing a summary of a television show episode) or active an interactive feature (e.g., a program information screen, a recording process, a future showing list, etc.) associated with an entry of the program guide.

The on-demand (OD) source 115 receives data from a plurality of sources, including, for example, television broadcasting networks, cable networks, system administrators (e.g., providers of the DTH system 100), or other content distributors. Such content may include television programs, sporting events, movies, music, and corresponding information (e.g., user interface information for OD content) for each program or event. The content may be stored (e.g., on a server) at the transmission station 102 or locally (e.g., at a receiver station 106), and may be updated to include, for example, new episodes of television programs, recently released movies, and/or current advertisements for such content. Via a user interface, which also may be updated periodically, a user (e.g., a person with a subscription to an OD service) may request (i.e., demand) programming from the OD source 115. The system 100 may then stream the requested content to the user (e.g., over the satellite/relay 104 or the network 122) or make it available for download and storage (discussed further below in connection with FIG. 2). Thus, an OD service allows a user to view, download, and/or record selected programming at any time.

The satellite/relay 104 receives the modulated, encoded Ku-band bitstream and re-broadcasts it downward toward an area on earth that includes the receiver station 106. In the illustrated example of FIG. 1, the example receiver station 106 includes a reception antenna 126 connected to a low-noise-block (LNB) 128 that is further connected to an integrated receiver/decoder (IRD) 130. The IRD 130 may be a set-top box, a personal computer (PC) having a receiver card installed therein, or any other suitable device.

The receiver station 106 may also incorporate a connection 136 (e.g., Ethernet circuit or modem for communicating over the Internet) to the network 122 for transmitting requests and other data back to the transmission station 102 (or a device managing the transmission station 102 and overall flow of data in the example system 100) and for communicating with websites 124 to obtain information therefrom.

In operation of the receiver station 106, the reception antenna 126 receives signals including a bitstream from the satellite/relay 104. The signals are coupled from the reception antenna 126 to the LNB 128, which amplifies and, optionally, downconverts the received signals. The LNB output is then provided to the IRD 130.

Figure 2:
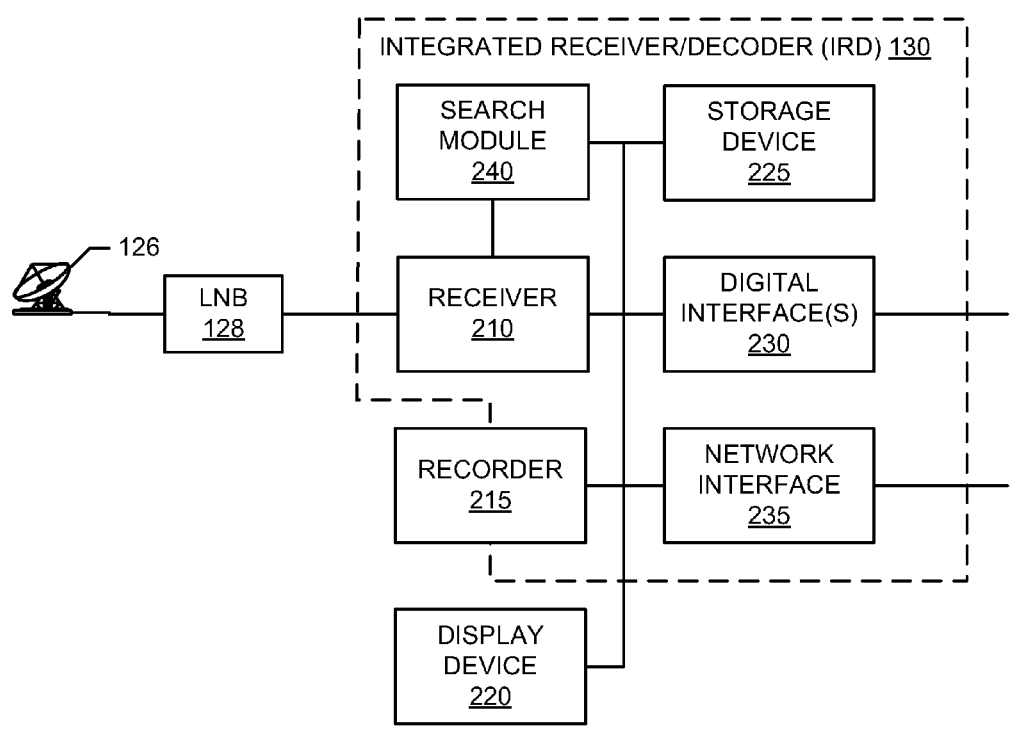
FIG. 2 illustrates an example manner of implementing the example integrated receiver/decoder (IRD) of FIG. 1.

FIG. 2 illustrates one example manner of implementing the IRD 130 (e.g., a set-top box) of FIG. 1. The IRD 130 of FIG. 2 is merely an example and other IRD implementations are possible. The LNB output is provided to a receiver 210, which receives, demodulates, de-packetizes, de-multiplexes, decrypts and/or decodes the received signal to provide audio and video signals to a display device 220 (e.g., a television set or computer monitor) and/or a recorder 215. The receiver 210 is responsive to user inputs to, for example, tune to a particular program.

As illustrated in FIG. 2, the recorder 215 may be implemented separately from and/or within the IRD 130. The recorder 215 may be, for example, a device capable of recording information on a storage device 225, for instance, analog media such as videotape, or computer readable digital media such as a hard disk drive, a digital versatile disc (DVD), a compact disc (CD), flash memory, and/or any other suitable media. The storage device 225 is used to store the packetized assets and/or programs received via the satellite/relay 104 or the network 122 via connection 136 (e.g., a movie requested from the OD source 115). In particular, the packets stored on the storage device 225 are the same encoded and, optionally, encrypted packets created by the transmission station 102 and transmitted via the satellite/relay 104.

To communicate with any of a variety of clients, media players, etc., the example IRD 130 includes one or more digital interfaces 230 (e.g., USB, serial port, Firewire, etc.). To communicatively couple the example IRD 130 to, for instance, the Internet and/or a home network, the example IRD 130 includes a network interface 235 that implements, for example, an Ethernet interface.

Figure 8:
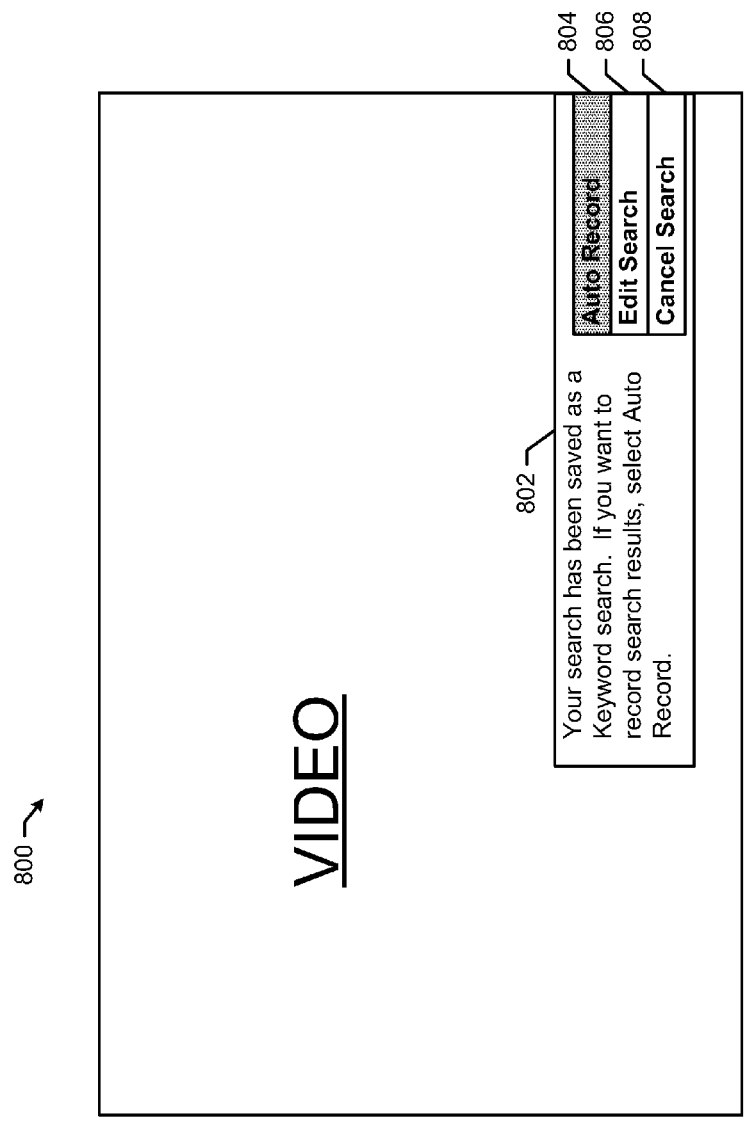
FIG. 8 shows an example screenshot of a media presentation system implementing the example process of FIG. 7.

Further, the example IRD 130 includes an example search module 240 to manage and/or perform one or more searches of, for example, a database having identifying data associated with a plurality of programs, such as the program guide data source 114. As used herein, the term 'program' refers to any type(s) of media content, including, by way of illustration and not limitation, television programming, music, on-demand programming, pay-per-view programs, advertisement(s), game(s), on-demand lesson(s), instructional video(s), etc. The example search module 240 implements a search interface (e.g., the title search interface 502 described below in connection with FIG. 5, the saved searches interface 602 described below in connection with FIG. 6, and/or the options interface 802 described below in connection with FIG. 8) that may be accessed via, for example, a dedicated button on a remote control, an option on a program guide or general user interface, a prompt generated by a control signal, and/or any other suitable method of providing access to one or more search operations implemented by the example search module 240. As described in greater detail below, the example search module 240 implements multiple types of searches, including name/title searches, keyword searches, and/or any other type of suitable search to explore and/or identify available media content. For purposes of illustration, example search operations include searches using title(s), actor(s), actress(es), artist(s), episode(s), program description(s), season number(s), date(s), director, genre, etc.

Given the availability of multiple types of searches, user interfaces typically include distinct portions or segments for different types of searches. For example, a keyword search may be implemented via a first user interface while name/title searches may be implemented via a second user interface. Alternatively, different types of searches may be implemented on separate portions of a common user interface. Thus, in typical systems, when a user is unable to acquire the desired information from one type of search (e.g., a name/title search that returns a null set of results), the user is required to enter (or reenter) search data into another type of search (e.g., a keyword search), often requiring the user to exit and enter multiple user interfaces or portions thereof and, perhaps, to remember lengthy strings of characters, terms, phrases, etc. Further, in some systems, one type of search (e.g., a name/title search) may not include certain search-related features (e.g., an ability to save search data) that are available in another type of search (e.g., a keyword search), which may be undesirable.

Generally, the example search module 240 described herein enables a user to store and/or reuse search data when, for example, a search does not produce the desired information or when the user desires to repeat the search at some later time. Thus, in one example implementation, when a user runs a title search that does not produce any results, the user can save the entered search query (e.g., "The History of Whales") to be used again at a later time, either automatically or through user intervention. This enables the user to rerun the title search on an updated dataset (e.g., new programming information) in, for example, one or two weeks, when the queried database (e.g., the program guide data source 114) has been updated to include new program descriptions, titles, actor name, etc. Additionally or alternatively, the search may be run by the system on an automated (e.g., without user invention), continuous basis. The example search module 240 also provides an option to convert one type of search data to into another type of search data that, in addition, may be stored for future searches. Further, the example search module 240 cooperates with, inter alia, the recorder 215 and the storage device 225 to perform automatic recordings of programming based on stored search data.

Figure 3:
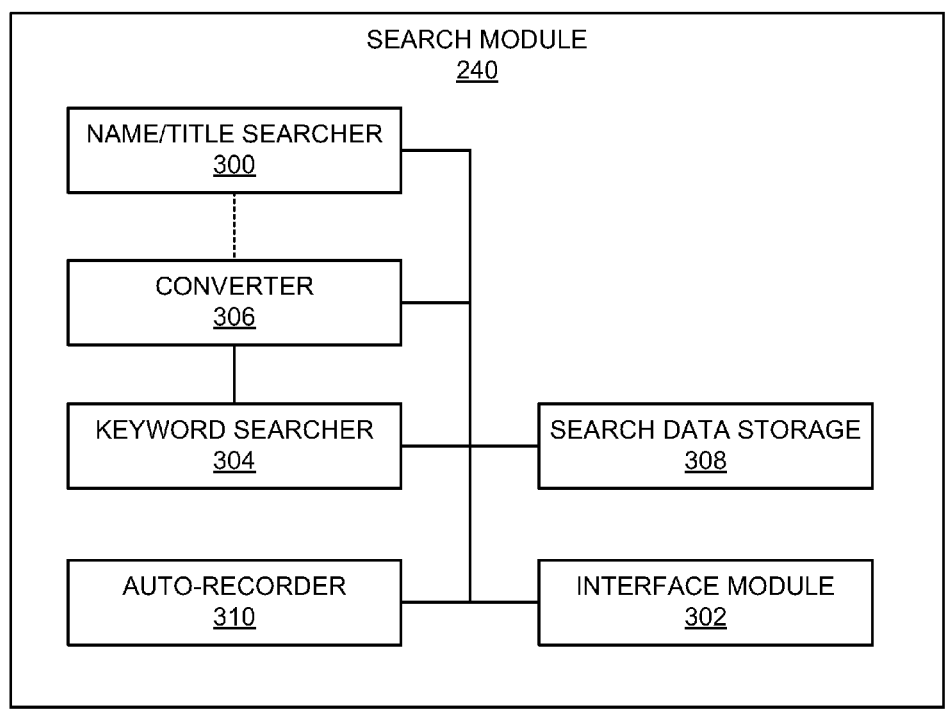
FIG. 3 illustrates an example manner of implementing the example search module of FIG. 2.

FIG. 3 illustrates an example implementation of the example search module 240 of FIG. 2. The example search module 240 includes a name/title searcher 300, an interface module 302, a keyword searcher 304, a converter 306, a search data storage device 308, and an auto-recorder 310. To perform a name/title search, the search module 240 receives a string of individual characters (e.g., the first three letters of a program title received one at a time) representing a portion of, for example, a desired program title or a name of an actor, actresses, director, etc. To receive the string, the interface module 302 implements a user interface (e.g., the title search interface 502 of FIG. 5) to be presented on the display device 220 of FIG. 2. In some examples, the user engages elements of a keypad (e.g., up, down, left, and/or right arrows) on a remote control to enter one or more characters in the user interface, as described in greater detail below in connection with FIGS. 4 and 5. Each character is conveyed to the example name/title searcher 300. Generally, the name/title searcher 300 first compares a first character in the received string to a plurality of first characters of identifying information, such as program titles or names, associated with one or more programs and stored in, for example, the program guide data source 114. In some examples, the IRD 130 periodically downloads identifying information associated with programming scheduled for presentation (e.g., episodes of television series) or scheduled to be made available (e.g., a pay-per-view movie) in the next two weeks. Alternatively, the identifying information for the next two days, three weeks, or any other suitable time period may be downloaded by the IRD 130. The identifying information may be categorized (e.g., indexed) to facilitate the comparison made by the name/title searcher 300. Such a categorization can be done by the program guide data source 114 and/or the IRD 130.

The name/title searcher 300 uses the results of the comparison(s) to narrow a list (e.g., the example result list 506 of FIG. 5) of the available programs (or any other type(s) of media content) to display, via the interface module 302, the matching programs (if available) remaining in the list. For example, if the first character of the received string is 'D,' the name/title searcher 300 displays (e.g., in alphabetical order) the available programs having identifying information starting with 'D.' If the user desires to further narrow the list, a second character may be entered and the name/title searcher 300 compares the second character of the received string to second characters of identifying information associated with the remaining programs. The name/title searcher 300 again uses the results of the comparison(s) to narrow the list. For example, if the first two characters of the string are 'DE,' the name/title searcher 300 displays the available programs having identifying information starting with 'DE.' This process may be repeated until either an exact match is found (if available), the list is empty (e.g., no available identifying information matches the received string of characters), the user chooses to exit the search operation (e.g., by engaging an exit button on a remote control), and/or the user selects an entry from list of matching programs (e.g., the example result list 506 of FIG. 5).

To perform a keyword search, the example search module 240 receives one or more terms or phrases (e.g., word(s) describing one or more aspects of the desired media content) and conveys that input to the example keyword searcher 304. In the illustrated example, the program guide data source 114, which includes one or more keywords associated with some or all of the available programs, is referenced by the keyword searcher 304 to perform the keyword search. As described above, the keyword data (along with the associated identifying information) of the program guide data source 114 may be periodically downloaded for upcoming programming (e.g., programming scheduled for presentation or availability in the next two weeks). For purposes of illustration, example keywords include terms or phrases related to or identifying cast member(s), director(s), producer(s), plot(s), release date(s), genre(s), artist(s), album title(s), program description(s) award(s), etc.

Similar to the name/title search described above, the interface module 302 implements a user interface, which is capable of receiving keyword(s) to be presented on the display device 220 of FIG. 2. In some examples, the user engages one or more elements of a keypad on a remote control (e.g., alphabetic or numerical buttons) to form keyword(s) related to the desired program. In other examples, the user may select a stored keyword (e.g., a converted and saved name/title search input) from a list (e.g., the list 604 of the saved search interface 602 of FIG. 6) instead of entering a keyword via a keypad. Generally, the keyword searcher 304 compares the received keyword(s) to the keyword(s) associated with available media content (e.g., as downloaded from the program guide data source 114) and returns a list including any matches (e.g., partial, inexact, and/or complete matches, depending on user configurable or manufacturer configurable settings) that were located during the comparison(s). The keyword searcher 304, via the interface module 302, displays the results in, for example, a list of the search user interface. The user can then select elements of the list to, for example, tune to a channel, record a program, retrieve information regarding a program, etc.

Further, the example search module 240 may implement alternative type(s) of searches using other or similar type(s) of input data. The example search module 240 may also access additional or alternative sources of information when performing a search. For example, in addition to the program guide data source 114, the search module 240 may inquire into the contents of a database (e.g., a memory structure stored on a hard disc drive) associated with a digital video recording (DVR) device or any type of removable media (e.g., a compact disc (CD), digital versatile disc (DVD), IPod®, etc.). Further, the name/title searcher 300, the keyword searcher 304, and/or any additional or alternative searchers implemented in the example search module 240 may utilize any suitable process, formula, and/or algorithm (e.g., a recursive search algorithm) to traverse through programming information (e.g., from the program data source 114) and/or to compare input data to identifying information or portions thereof.

As described below in connection with FIGS. 4 and 5, the example search module 240 provides a save-search option to store search data in the search data storage device 308 for later use (e.g., to rerun a name or title search in the future without requiring the user to reenter the name or title search data) and without having to reenter the search data into a separate search interface to store the search data. In the illustrated example, if the search data to be store upon engagement of the save-search option was entered in a name/title search (e.g., via the title search interface 502 of FIG. 5), the name/title searcher 300 conveys the search data, which comprises a string of character(s), to the converter 306. The converter 306 converts the string of characters into keyword search data (e.g., a term or phrase to be compared with keyword(s) from a database such as the program guide data source 114). In the illustrated example of FIG. 3, the converter 306 merges individual characters of the string(s) to form one or more unitary word(s) or term(s). In some examples, the converter 306 may alter an identification tag associated with the string(s) of characters identifying them as name/title search data to another value to indicate that the characters are keyword data. The converter 306 may utilize any suitable method or process to convert the search data. The example converter 306 conveys the resultant keyword search data to the search data storage device 308. Alternatively, the keyword search data may be stored in, for example, other memory communicatively coupled to or included in the search module 240.

In some alternative examples, if the search data to be stored upon engagement of the save-search option was entered in a name/title search (e.g., via the title search interface 502 of FIG. 5), the name/title searcher 300 may convey the search data to the search data storage device 308 without converting the search data to a keyword. Additionally, search data that was entered in a keyword search may be saved. Specifically, upon an engagement of the save-search option, the keyword searcher 304 conveys the search data, which comprises one or more keywords, to the search data storage device 308. Accordingly, the search data storage device 308 may implement a method of identifying a type of search data that it stores (e.g., using one or more identification tags).

As described below in connection with FIG. 6, the search module 240 may be instructed to provide a list of stored search data, which the user may select for a new or renewed search. In response, the interface module 302 references the search data storage device 308 to gather information related to the contents thereof and to present the same to the user (e.g., via the display device 220 of FIG. 2).

For purposes of illustration, when the name/title searcher 300 performs a name or title search (e.g., by entering a string of characters), only currently available programming information (e.g., information residing in the IRD 130) is queried. In the context of television programming, a data source (e.g., the program guide data source 114) queried by the search module 240 may only contain information associated with television programming scheduled to be presented (e.g., broadcasted) in the next two weeks. However, the user may be interested in one or more programs outside of the two week schedule. Perhaps the user became aware of (e.g., via a commercial or other advertisement) a new television series, a sporting event, or any other media content of interest that was scheduled for presentation at an unknown (to the user) time in the future. If the data source queried by the search module 240 does not include information regarding the desired event or media content (e.g., due to resource limitations or scheduling business rules), the user will not receive the desired information (e.g., the search will return a null result). The example search module 240, via the save-search option and related methods and apparatus described herein, provides an option to reuse the entered name/title search data in a subsequent search. Specifically, the save search function enables the user to save name/title search data of an unsuccessful search (e.g., a search returning a null result) instead of disregarding the search data or having to reenter the name/title search data in a keyword search interface Thus, the user may run a new search a week after the initial search using the stored search data to query identifying information that has been updated to reflect another week of upcoming programming.

Further, the example search module 240 enables the user to schedule automatic recording(s) (e.g., using a DVR) of some or all programs containing the stored search data (e.g., one or more keywords, such as name/title search data that has been converted into a keyword). Specifically, the auto-recorder 310 of FIG. 3 receives instructions (e.g., from user input via the options interface 802 of FIG. 8) to record, for example, any program associated with identifying information (e.g., a program description) containing a designated keyword. The auto-recorder 310 then schedules an automatic periodic keyword search to be performed by the keyword searcher 304 (e.g., once per day or week). If one of the periodic searches results in one or more matches, the auto-recorder 310 conveys identifying information (e.g., time, dates, channels, etc.) associated with the matching program(s) to the recorder 215 of FIG. 2, which records the media content accordingly. Additionally or alternatively, resulting matches may be stored in the search data storage device 308 with or without being recorded. As described below in connection with FIG. 6, these results can be displayed to the user in response to a selection of an entry of a list (e.g., the list 604 of FIG. 6). Further, the search module 240 enables the user to reschedule or otherwise manipulate the operation of the auto-recorder 310 (e.g., via the options interface 802 of FIG. 8).

While an example manner of implementing the search module 240 of FIG. 2 has been illustrated in FIG. 3, one or more of the elements, processes and/or devices illustrated in FIG. 3 may be combined, divided, re-arranged, omitted, eliminated and/or implemented in any other way. Further, the example name/title searcher 300, the example interface module 302, the example keyword searcher 304, the example converter 306, the example search data storage device 308, the example auto-recorder 310, and/or, more generally, the example search module 240 of FIG. 3 may be implemented by hardware, software, firmware and/or any combination of hardware, software and/or firmware. Thus, for example, any of the example name/title searcher 300, the example interface module 302, the example, keyword searcher 304, the example converter 306, the example search data storage device 308, the example auto-recorder 310, and/or, more generally, the example search module 240 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example name/title searcher 300, the example interface module 302, the example, keyword searcher 304, the example converter 306, the example search data storage device 308, the example auto-recorder 310, and/or, more generally, the example search module 240 of FIG. 3 are hereby expressly defined to include a tangible medium such as a memory, DVD, CD, etc. Further still, the example search module 240 of FIG. 3 may include one or more elements, processes and/or devices in addition to, or instead of, those illustrated in FIG. 3, and/or may include more than one of any or all of the illustrated elements, processes and devices.

Although the following discloses example processes through the use of flow diagrams having blocks, it should be noted that these processes may be implemented in any suitable manner. For example, the processes may be implemented using, among other components, software, or firmware executed on hardware. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.), exclusively in software, exclusively in firmware, or some combination of hardware, firmware, and/or software. For example, instructions representing some or all of the blocks shown in the flow diagrams may be stored in one or more memories or other machine readable media, such as hard drives or the like (e.g., the memories 906 and/or 908 of FIG. 9). Such instructions, which may be executed by one or more processors (e.g., the processor 902 of FIG. 9), may be hard coded or may be alterable. Additionally, some portions of the processes may be carried out manually. Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes. Further, while certain buttons (e.g., 'Select') are described below, it will be appreciated that the titles or names of such buttons are meant for illustrative purposes and that other suitable names, symbols, or numbers may be assigned to similar buttons to represent the following instructions, features, options, and/or instructions similar thereto.

Figure 4:
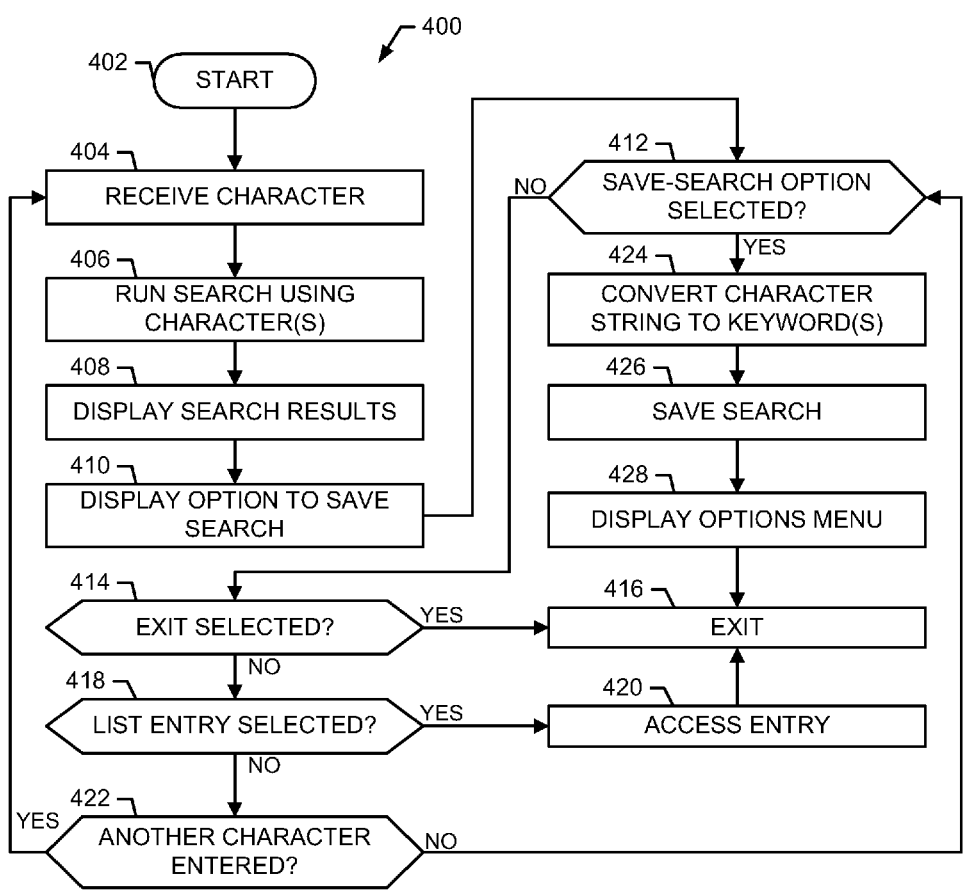
FIG. 4 is a flowchart representing an example process that may be performed by a media presentation system implementing the example search module of FIG. 2.
Figure 5:
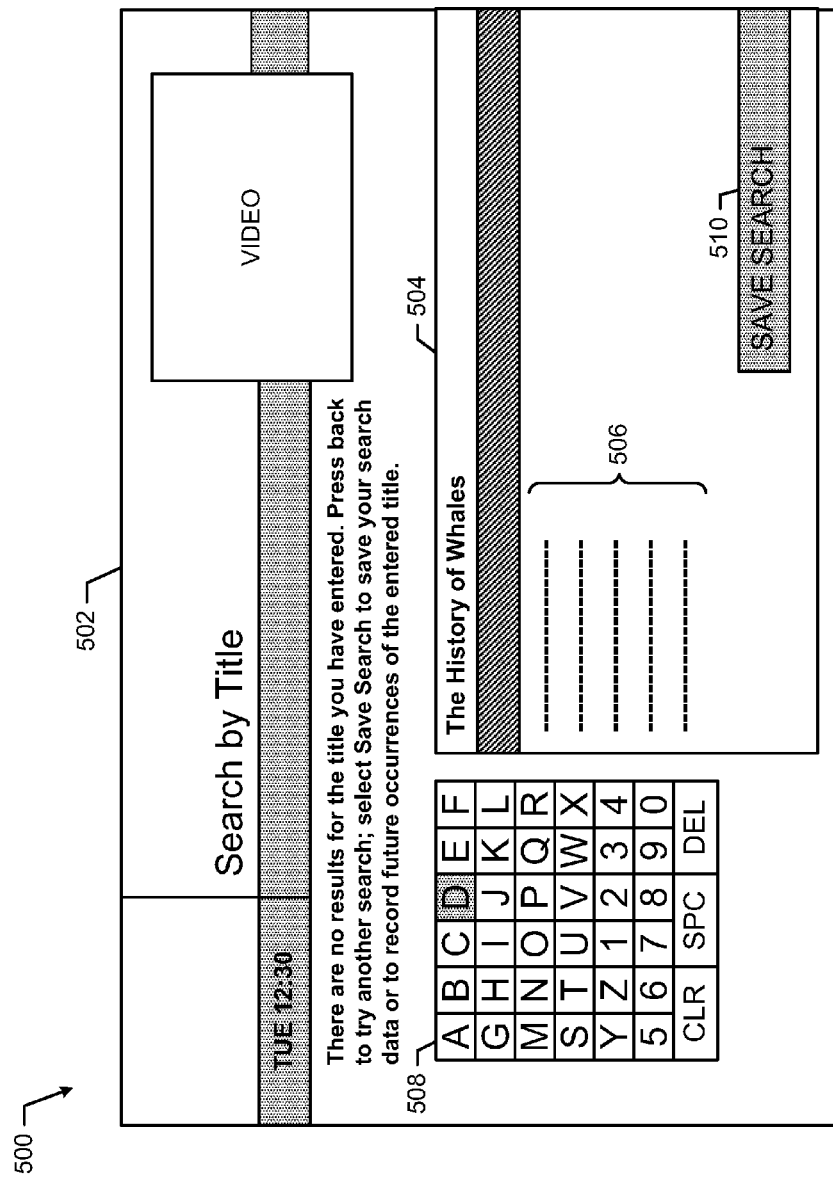
FIG. 5 shows an example screenshot of a media presentation system implementing the example process of FIG. 4.

FIG. 4 is a flowchart representing an example process 400 that may be implemented via, for example, the example search module 240 of FIG. 3. Specifically, the example process 400 enables a user to run a name/title search, to convert name/title search data to keyword search data, and/or to save the resulting keyword search data for later use (e.g., in another search performed when the queried identifying information is updated). For illustrative purposes, the process 400 is described in conjunction with an example screenshot 500 of FIG. 5. However, the example process 400, the example screenshot 500, and the associated features and methods described in connection therewith (e.g., the title search interface 502 of FIG. 5), are non-limiting examples meant for illustrative purposes. While the example methods and apparatus described herein may by implemented to perform a name or title search, the example process 400 and the example screenshot 500 describe and illustrate a title search for purposes of clarity. A substantially similar name search may be implemented using methods and apparatus substantially similar to those of FIGS. 4 and 5.

The process 400 begins with an activation of a title search (block 402). For example, a user may engage an on-screen button or menu or a key on a remote control dedicated to a title search, thereby causing the screenshot 500 of FIG. 5 to be presented on the display device 220 of FIG. 2. The screenshot 500 shows a title search interface 502 that includes an input field 504, a result list 506, a character selection grid 508, and a "Save Search" button 510. Using, for example, the character selection grid 508, the user enters a character (e.g., by pressing an 'Enter' button on a remote control when the desired character is highlighted, such as the letter 'D' in FIG. 5) in the input field 504. Additionally or alternatively, characters may be entered using an alphanumeric keypad or a device (e.g., a remote) having characters assigned to numbers (e.g., three letters assigned to each number on a number pad) or other type(s) of keys. The selected character is received by the interface module 302, which conveys character information (e.g., directly or after a data translation by the interface module 302) to the name/title searcher 300 of FIG. 3 (block 404). As described above, the name/title searcher 300 has access to identifying information, such as titles, associated with instance(s) of upcoming programming (e.g., as downloaded onto the IRD 130 from the program guide data source 114). The character information entered by the user is then compared to characters in a corresponding position (e.g., the leftmost position of a term) of the identifying information (block 406). For example, the first received character is compared to the first letter of the titles listed in the identifying information associated with upcoming programming. The comparison results in one or more matches and/or mismatches between the search data and the identifying information being searched. If the search produces any matches (e.g., successful results), the name/title searcher 300 conveys these results to the interface module 302, which causes the display of the results in the result list 506 (block 408). Specifically, if the received character (from the input field 504 of FIG. 5) and the corresponding character of any instances of identifying information match, the result list 506 includes one or more entries of upcoming programming associated with the matching identifying information. In the illustrated example, the result list 506 is shown as empty (e.g., no matches occurred at block 406). However, where the search produces results, program titles, for example, replace the lines shown in the results list 506 of FIG. 5.

Then, the interface module 302 causes a display of the "Save Search" button 510 (block 410). Alternatively, the "Save Search" button 510 may be displayed at any other suitable time during, before, and/or after the process 400 (e.g., at the initialization of the title search). For example, the save-search functionality may be accessed using a key on a remote that an on-screen message (e.g., "Press the GREEN key to save this search") instructs the user to engage if a search is to be saved. As described above, the "Save Search" button 510 enables the user to save the entered search data (e.g., one or more characters to represent a desired title) for a later search (e.g., a search to be run after the identifying information to be queried by the title searcher 300 is updated). For example, as shown in FIG. 5, the user entered the title search data "The History of Whales," which, as indicated by the empty result list 506, did not match any programming information in the queried database (e.g., the program guide data source 114). Instead of exiting the name/title search interface 502, reentering the search data into another search interface (e.g., a keyword search interface), and, perhaps rerunning the search, the user may engage the "Save Search" button 510 to store the entered search data (e.g., "The History of Whales).

If the "Save Search" button 510 is not selected (block 412), the example process 400 of FIG. 4 then determines if an exit button (e.g., an on-screen button or a key on a remote control) is selected (block 414). If so, the process 400 ends (block 416). Otherwise, the process 400 of FIG. 4 determines if an entry of the result list 506 has been selected (block 418). For example, the search executed by the name/title searcher 300 at block 406 may have produced the program that the user sought to find. If so, and the user selects that entry in the result list 506 (e.g., by pressing a dedicated button on a remote control when the entry is highlighted), the search module 240 causes the receiver 210 of FIG. 2 to access the program represented by the entry in the result list 506 (block 420). Accessing the program may include tuning to a channel, displaying information associated with the program (e.g., a cast list, an episode plot summary, upcoming broadcasts, etc.), decoding a program from a hard disk or other memory, streaming/downloading a program over the Internet, displaying recording options associated with the program, etc. The example process 400 of FIG. 4 then ends (block 416). Alternatively, control may return to block 402 to begin another title search.

Referring back to block 418, if an entry from the result list 506 has not been selected, the process 400 determines if another character has been entered in the title search (e.g., another character added to the input field 504 to form the string of characters used by the name-title searcher 300) (block 422). If so, control returns to block 404 where the interface module 302 receives the additional character (e.g., in the input field 504 of FIG. 5) and the search module 240 repeats the processes described above. Otherwise, control passes to block 412, where the process 400 determines if the "Save Search" button 510 has been selected.

In the illustrated example, if the "Save Search" button 510 is engaged (e.g., by pressing a dedicated button on remote control while the "Save Search" button 510 is highlighted) (block 412), the title searcher 300 conveys the user-entered search data to the converter 306 of FIG. 3. In the illustrated example, the converter 306 converts the title search data, which comprises a string of characters, into one or more keywords (block 424). Generally, in the illustrated example, the converter 306 merges individual characters of the string(s) to form one or more unitary word(s) or term(s). In some examples, the converter 306 may alter an identification tag associated with the string(s) of characters identifying them as name/title search data to another value to indicate that the characters are keyword data. If the string of characters making up the title search data includes spaces between characters, the example converter 306 of FIG. 3 interprets the spaces as defining separate keywords. Alternatively, the converter 306 may convert the string of characters (e.g., including spaces when there is more than one word) into a single keyword that includes spaces. The converter 306 may utilize any suitable method or process to convert the search data. For example, the converter 306 may omit unneeded words (e.g., short prepositions and articles) from the search criteria. For example, the converter may convert the title search "The History of Whales" to a keyword search that is stored as "History, Whales."

Then, the converter 306 conveys the resultant keyword search data to the search data storage device 308 to be stored (e.g., in a memory structure of the search data storage device 308 or in communication with the data storage device 308) (block 426). In other example implementations, the search data storage device 308 may receive name/title search data directly from the name/title searcher (e.g., without first being conveyed to the converter 306). As described above, the "Save Search" button 510 may store name/title search data and/or keyword search data that resulted from the conversion of name/title search data into one or more keywords. Contents of the search data storage device 308 are accessible by the interface module 302, the name/title searcher 300, and/or the keyword searcher 304 to enable the user to reuse saved keyword search data. Thus, in the example of FIG. 5, the user can run a new search (e.g., via the saved search interface 602 of FIG. 6) at a later time using the title search data entered into the input field 504.

To provide further options to the user after saving search data (e.g., the ability to auto-record future programs having identifying information related to saved search data), the interface module 302 displays an option menu (block 428). An example option menu 802 is described below in connection with and illustrated in FIG. 8. The example process 400 of FIG. 4 then ends (block 416). Alternatively, control may return to block 402 to begin another title search.

Figure 6:
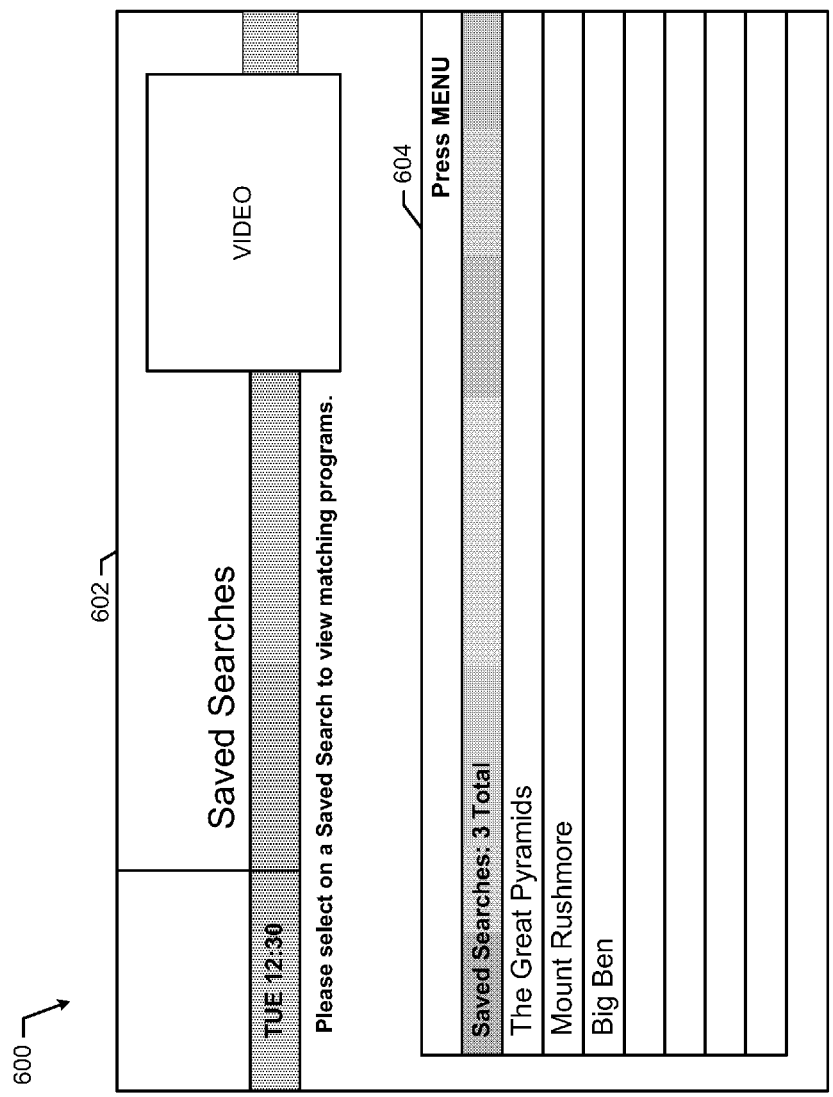
FIG. 6 shows an example screenshot of a media presentation system implementing a user interface to access stored search data.

FIG. 6 shows an example screenshot 600 of a saved searches interface 602 including a list 604 having one or more entries corresponding to saved search data. The saved searches interface 602 provides user access to the contents of the search data storage device 308 of FIG. 3. The saved searches interface 602 may be displayed (e.g., on the display device 220 of FIG. 2) in response to an engagement of an on-screen button or a key on a remote control dedicated to the saved searches interface 602. In the illustrated example, selecting one of the entries of the list 602 (e.g., by highlighting the entry with an on-screen cursor via a remote control and pressing a dedicated button on the remote) causes the interface module 302 to access the search data storage device 308 and search the contents thereof. As described above, the search data storage device 308 contains search data that has been stored by, for example, converting title search data into keyword search data and storing the resultant keyword search data, conveying name/title search data to the search data storage device 308 after an unsuccessful name/title search, or any other suitable manner. Thus, in the illustrated example, in response to an engagement of one of the entries of list 604, the search data storage device 308 conveys search data corresponding to the selected entry to the name/title searcher 300 and/or the keyword search 304.

Additionally or alternatively, the search data storage device 308 may include search results (e.g., one or more matching programs) that were generated by an automation search using the saved search data. In such instances, the search data storage device 308 may convey the search results to the interface module 302 for display in response to a selection of one of the entries of the list 602.

Figure 7:
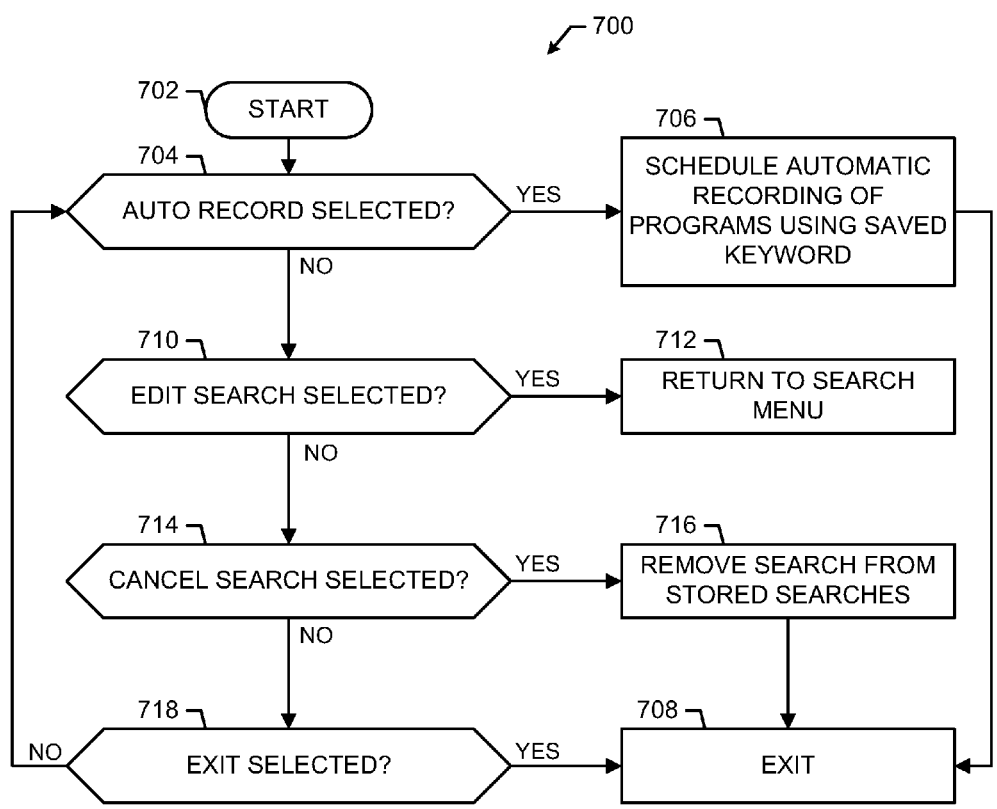
FIG. 7 is a flowchart representing an example process that may be performed by a media presentation system implementing the example search module of FIG. 2.

FIG. 7 is a flowchart representing an example process 700 that may be implemented via, for example, the example search module 240 of FIG. 3. Specifically, the example process 700 enables a user to select from a plurality of options associated with saved search data. For illustrative purposes, the process 700 is described in conjunction with an example screenshot 800 of FIG. 8. However, the example process 700, the example screenshots 800, and the associated features and methods described in connection therewith (e.g., the option menu 802 of FIG. 8), are non-limiting examples meant for illustrative purposes.

The process 700 begins when a user selects an option to save search data (e.g., at block 426 of FIG. 4). In the illustrated example, the process 700 begins in response to the selection of the "Save Search" button 510 of FIG. 5 (block 702). Specifically, as described above in connection with block 428 of FIG. 4, the interface module 302 of FIG. 3 displays an option menu 802 (FIG. 8) after search data has been stored in the search data storage device 308. In the illustrated example, the option menu 802 includes an auto-record button 804, an edit button 806, and a cancel button 808. The example option menu 802 is overlaid on, for example, a live broadcast of television programming that is displayed after the "Save Search" button 510 of FIG. 5 is engaged. Any of the example buttons of the option menu 802 are selected by, for example, pressing a 'Select' button when the desired button is highlighted with a cursor.

If the auto-record button 804 is selected (block 704), the interface module 302 conveys an indication of the selection to the auto-recorder 310 of FIG. 3. The auto-recorder 302 facilitates an interaction between the name/title searcher 300, the keyword searcher 304, and/or the search data storage device 308 and the recorder 215 of FIG. 2. Specifically, the auto-recorder 310 includes one or more schedules that cause the keyword searcher 304 to periodically access the search data storage device 308 and to run a search using the contents thereof (block 706). Further, the auto-recorder 310 conveys the results of the keyword searches (if any) or information related thereto (e.g., an SCID) to the recorder 215 to be recorded and stored in the storage device 225. The process 700 then ends (block 708).

If the edit button 806 is selected (block 710), the interface module 302 presents a search interface (e.g., the name/title search interface 502 of FIG. 5) with the saved keyword data (e.g., the data that the user desires has chosen to edit) being displayed in an input field 704 (e.g., the input field 504 of FIG. 5) (block 712). In the illustrated example, control is returned to a search process (e.g., the example process 400 of FIG. 4) to enable the user to edit and/or rerun the saved keyword search data or to access other saved search data If the cancel button 808 is selected (block 714), the previously saved search data is removed from the search data storage device 308 (block 716). In the illustrated example, the interface module 302 removes the search data from the search data storage device 308. However, as described above, the name/title searcher 300 and the keyword searcher 304 have access to the search data storage device 308 and may remove the saved search data at block 716. If an 'Exit' button is selected (block 718) before any of the other options, the process 700 of FIG. 7 ends. Otherwise, control returns to block 704 to await a selection of one the options described above.

Figure 9:
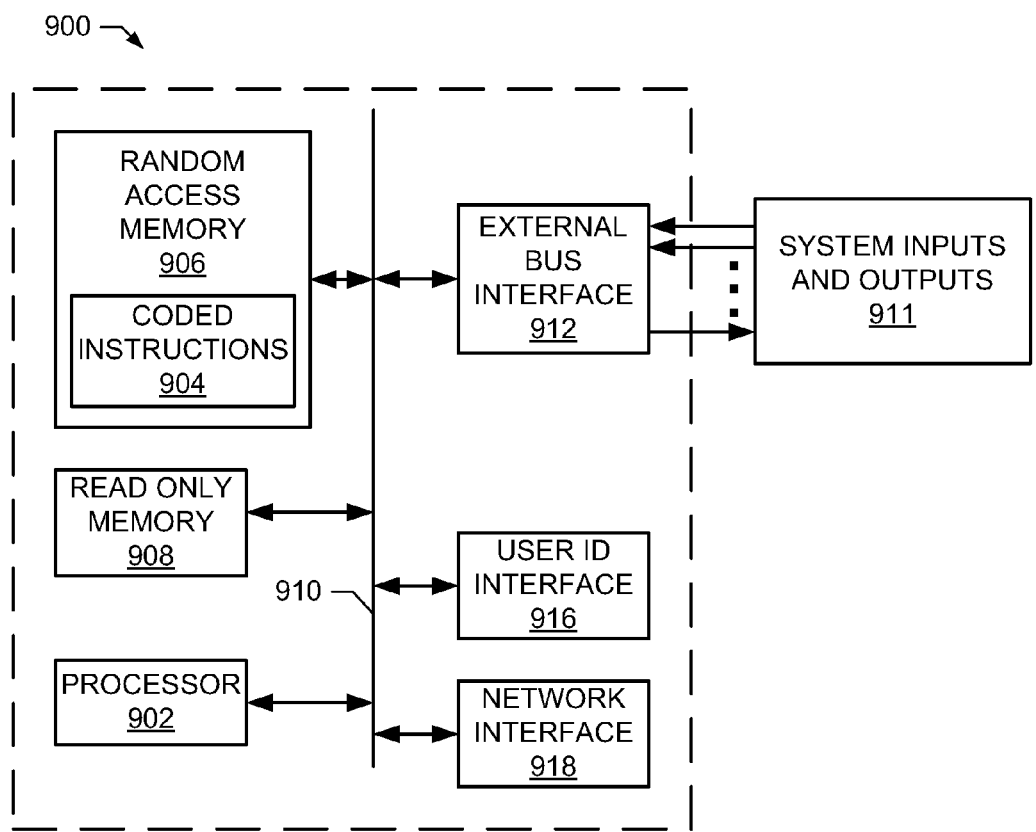
FIG. 9 illustrates an example manner of implementing an example processor unit to execute the example methods and apparatus described herein.

FIG. 9 is a schematic diagram of an example manner of implementing an example processor unit 900 to execute the example methods and apparatus described herein. The example processor unit 900 of FIG. 9 includes a general purpose programmable processor 902. The example processor 902 may execute, among other things, machine accessible instructions 904 (e.g., instructions present within a random access memory (RAM) 906 as illustrated and/or within a read only memory (ROM) 908) to perform the example processes described herein. The example processor 902 may be any type of processing unit, such as a microprocessor.

The processor 902 may be coupled to an interface, such as a bus 910 to which other components may be interfaced. The example RAM 906 may be implemented by dynamic random access memory (DRAM), Synchronous DRAM (SDRAM), and/or any other type of RAM device, and the example ROM 908 may be implemented by flash memory and/or any other desired type of memory device. Access to the example memories 908 and 906 may be controlled by a memory controller (not shown) in a conventional manner.

To send and/or receive system inputs and/or outputs 911, the example processor unit 900 includes any variety of conventional interface circuitry such as, for example, an external bus interface 912. For example, the external bus interface 912 may provide one input signal path (e.g., a semiconductor package pin) for each system input. Additionally or alternatively, the external bus interface 912 may implement any variety of time multiplexed interface to receive output signals via fewer input signals.

To allow the example processor unit 900 to interact with a remote server, the example processor unit 900 may include any variety of network interfaces 918 such as, for example, an Ethernet card, a wireless network card, a modem, or any other network interface suitable to connect the processor unit 900 to a network. The network to which the processor unit 900 is connected may be, for example, a local area network (LAN), a wide area network (WAN), the Internet, or any other network. For example, the network could be a home network, an intranet located in a place of business, a closed network linking various locations of a business, or the Internet.

Although an example processor unit 900 has been illustrated in FIG. 9, processor units may be implemented using any of a variety of other and/or additional devices, components, circuits, modules, etc. Further, the devices, components, circuits, modules, elements, etc. illustrated in FIG. 9 may be combined, re-arranged, eliminated and/or implemented in any of a variety of ways.

The apparatus and methods described above are non-limiting examples. Although the example apparatus and methods described herein include, among other components, software executed on hardware, such apparatus and methods are merely illustrative and should not be considered as limiting. For example, it is contemplated that any or all of the disclosed hardware and software components could be embodied exclusively in dedicated hardware, exclusively in software, exclusively in firmware or in some combination of hardware, firmware, and/or software.

Further, although certain example methods and apparatus have been described herein, the scope of coverage of this patent is not limited thereto. On the contrary, this patent covers all methods and apparatus fairly falling within the scope of the appended claims either literally or under the doctrine of equivalents.

What is claimed is:

1. A method for use with a media presentation system, comprising:
   receiving a string of one or more characters in connection with a first type of search in which the string is compared to one type of identifying data of a plurality of types of identifying data stored in a data source;
   performing the first type of search using the received string;
   in response to the first type of search returning a null result, converting the string into one or more keywords formatted for a second type of search in which the keywords are compared to multiple ones of the types of identifying data of the data source;
   storing the one or more keywords in a collection of keyword search data; and
   automatically performing the second type of search of the data source using the converted one or more keywords as a query into the multiple ones of the types of identifying data of the data source when the data source has been updated since the performance of the first type of search.

2. A method as defined in claim 1, wherein the first type of search is a title search and the sting comprises a title of a program.

3. A method identified in claim 1, wherein the first type of each is a name search and the string comprises a name associated with a program.

4. A method as defined in claim 1, wherein converting the string into the one or more keywords comprises omitting at least one of the characters from the one or more keywords.

5. A method as defined in claim 1, wherein the data source queried by the first and second types of search is a database of programming information.

6. A method as defined in claim 5, further comprising prompting at user to save the string when the first type of search of the database returns the null result.

7. A method as claimed in claim 5, further comprising prompting a user to save the string when the first type of search of the database returns a valid result.

8. A method as defined in claim 1, wherein automatically performing the second type of search when the data source has been updated since the performance of the first search the comprises periodically searching programming information of the data source with the one or more keywords.

9. A method as defined in claim 8, further comprising automatically recording programs with identifying data matching the one or more keywords found in the data source during the periodic searching.

10. A method as defined in claim 1, further comprising enabling a user to select the stored keyword search data to trigger a search of the second type using the converted one or more keywords.

11. A method as defined in claim 1, wherein the automatic performance of the second type of search using the stored keyword search data is performed automatically by a machine.

12. A method as defined in claim 1, further comprising providing a user interface to enable a user to edit the contents of the collection of keyword search data.

13. A method as defined in claim 1, further comprising:
   when the first type of search returns search results, displaying the search results and an option to save the received string of one or more characters for a subsequent search of the second type, wherein the conversion of the string into the one or more keywords is performed in response to a selection of the option by a user.

14. An apparatus for use in a media presentation system, comprising:
   an interface module to receive one or more characters to form a string, the string being intended for a first type of search in which the string is compared to one type of identifying data of a plurality of types of identifying data of a data source;
   a searcher to perform the first type of search using the received string;
   a converter to, in response to the performed first type of search returning a null result, convert, using a processor unit having a tangible memory, the string into one or more keywords formatted for a second type of search in which the string is compared to multiple ones of the plurality of types of identifying data of the data source;
   a search data storage device to store the one or more keywords in a collection of keyword search data, wherein the searcher is automatically perform the second type of search of the data source using the one or more converted keywords as a query into the multiple ones of the types of identifying data of the data source when the data source has been updated since the performance of the first type of search.

15. An apparatus as defined in claim 14, wherein the searcher comprises a keyword searcher having access to the search data storage device to perform the second type of search using the query.

16. An apparatus as defined in claim 14, wherein the searcher comprises a name or title searcher to perform the first type of search.

17. An apparatus as defined in claim 14, wherein the searcher is to automatically perform the second type of search when the data source has been updated since performance of the first type of search by periodically searching programming information using contents of the search data storage device.

18. An apparatus as defined in claim 14, further comprising a recorder in communication with the searcher to record programming associated with results of the second type of search.

19. A media presentation system comprising:
 a transmission system capable of generating and transmitting streams of broadcast media;
 a receiver capable of receiving the broadcast media and generating video and audio output signals, the receiver including a search module, wherein the search module comprises:
  an interface module to receive one or more characters to form a string and a designation indicating that the string is to be used in a first type of search in which the string is compared to a first type of identifying data of a plurality of types of identifying data of a data source;
  a searcher to perform the first type of search using the string;
  a converter to, in response to the string not being found in the data source via the first type of search, convert the string to one or more keywords to be used in a second type of search in which the string is compared to each of the plurality of types of identifying data of the data source;
  a search data storage device to store the one or more keywords in a collection of keyword search data, wherein the searcher is to, when the data source has been updated since the performance of the first type of search, automatically perform the second type of search of the data source using the converted one or more keywords.

20. A media presentation system as defined in claim 19, further comprising a user interface to receive the one or more characters in an input field to be populated by a user.

21. A media presentation system as defined in claim 19, further comprising an auto-recorder to schedule one or more recordings in connection with the periodic searches using the stored keyword search data.

22. A media presentation system as defined in claim 19, wherein converting the string into the one or more keywords comprises omitting at least one of the received characters from the one or more keywords.

* * * * *